United States Patent
Fabbri

(10) Patent No.: US 10,597,231 B2
(45) Date of Patent: Mar. 24, 2020

(54) SYSTEM AND METHOD FOR STORING WATER IN AN UNDERGROUND RESERVOIR AND MANAGING THE SAME

(71) Applicant: Next Tier Agribusiness, LLC, Bakersfield, CA (US)

(72) Inventor: Jeffrey S. Fabbri, Bakersfield, CA (US)

(73) Assignee: NEXT TIER AGRIBUSINESS, LLC, Bakersfield, CA (US)

( * ) Notice: Subject to any disclaimer, the term of this patent is extended or adjusted under 35 U.S.C. 154(b) by 0 days.

(21) Appl. No.: 16/456,604

(22) Filed: Jun. 28, 2019

(65) Prior Publication Data

US 2019/0329980 A1 Oct. 31, 2019

Related U.S. Application Data

(63) Continuation-in-part of application No. 15/705,195, filed on Sep. 14, 2017, now Pat. No. 10,336,544.

(51) Int. Cl.
*B65G 5/00* (2006.01)
*E03B 11/14* (2006.01)
*E03B 3/02* (2006.01)

(52) U.S. Cl.
CPC .............. *B65G 5/005* (2013.01); *E03B 11/14* (2013.01); *E03B 3/02* (2013.01)

(58) Field of Classification Search
CPC .......... B65G 5/005; B65G 5/00; E03B 11/14; E03B 3/08; E21B 43/12
See application file for complete search history.

(56) References Cited

U.S. PATENT DOCUMENTS

| | | |
|---|---|---|
| 4,180,348 A | 12/1979 | Taylor |
| 4,669,536 A | 6/1987 | Ames et al. |
| 5,228,802 A | 7/1993 | Kuwabara et al. |
| 6,357,969 B1 | 3/2002 | Wheeler, Jr. et al. |
| 6,840,710 B2 | 1/2005 | Peters et al. |
| 7,042,234 B2 | 5/2006 | Buss |
| 7,192,218 B2 | 3/2007 | Peters et al. |
| 7,493,954 B2 | 2/2009 | Heller et al. |
| 7,967,989 B2 | 6/2011 | Gong et al. |
| 8,074,670 B2 | 12/2011 | Peters et al. |
| 8,337,121 B2 | 12/2012 | Poerio et al. |
| 9,146,206 B2 | 9/2015 | Rhodes et al. |
| 9,278,808 B1 | 3/2016 | McIntyre et al. |
| 9,371,185 B2 | 6/2016 | Gu et al. |
| 9,689,235 B1 | 6/2017 | Ayotte |
| 2005/0173124 A1 | 8/2005 | McDonald |

*Primary Examiner* — Carib A Oquendo
(74) *Attorney, Agent, or Firm* — James M. Duncan, Esq.; Klein DeNatale Goldner

(57) ABSTRACT

A water storage and management system takes water from a water source, such as captured run-off, and through a piping system, directs a flow of the water into an aquifer for storage and future utilization. Using moisture detectors, the system ascertains the water content of different layers or zones of the aquifer and reports this information to a digital processor. The digital processor may utilize this information to issue instructions to one or more control valves to direct the flow of the water into portions of the aquifer which have additional storage capacity. The digital processor may also instruct a submersible pump to withdraw from the aquifer as desired. This system is utilized in a method of banking groundwater from a remove location. Such groundwater storage may result in receipt of groundwater recharge credits.

20 Claims, 3 Drawing Sheets

SYSTEM AND METHOD FOR STORING WATER IN AN UNDERGROUND RESERVOIR AND MANAGING THE SAME

PRIOR APPLICATIONS

This is a continuation-in-part application to currently pending application Ser. No. 15/705,195 filed on Sep. 14, 2017 and issued as U.S. Pat. No. 10,336,544 on Jul. 2, 2019.

BACKGROUND OF THE INVENTION

The present invention relates to underground storage of water and more specifically to a system and method which directs water to underground storage zones having available storage capacity. The presently disclosed system and method further may be directed toward water storage in land where the land surface is utilized for other purposes, such as for agricultural use, thereby making efficient use of the land by allowing the concurrent use of the surface and subsurface.

In the face of growing demand for water and the statutory and regulatory framework which address groundwater sustainability, industries which rely on groundwater, especially agriculture, recognize the need to increase surface water imports and expand underground water storage capacity. Underground water storage reservoirs provide an alternative to storage of water in open reservoirs. Underground water storage reservoirs, i.e., aquifers, will have one or more porous and permeable layers. Porosity and permeability are the aquifer properties which, respectively, refer to the pore volume available for water storage and the hydraulic conductivity of the aquifer. For utilization for underground water storage, an underground zone must have available pore space and water must be able to flow through the zone to be recovered for utilization for irrigation or other use.

Groundwater recharge is a water management tool by which surplus surface water supplies are stored underground for later recovery during periods of reduced water supply. Recharge reduces or eliminates the need to construct costly surface reservoirs which are prone to excessive evaporation losses, particularly in and climates in the Western United States. With heavy rain or snow fall, water must be released from surface reservoirs must be released to make room for inflow. Recharge has the added benefit of improving water quality by filtration through underlying sediments.

In general, if farmers and municipalities and quasi-municipalities, such as water districts, irrigation districts and water storage districts (collectively "water districts") are able to conserve water and bank some of their allocation, they will be able to reclaim it later, either for their own use or for sale. In programs offered by some water districts, incentives are offered to private landowners to provide groundwater recharge facilities for banking surplus water for future extraction. These programs typically anticipate that water will be delivered to the private recharge facilities through district-owned distribution systems and that the water will be introduced into the underground reservoir by surface recharge basins. However, the water district may also store surface water for others within district-owned recharge facilities and the water district receive benefit for storing the groundwater.

The surface recharge basins are typically required to be open, unfarmed, fallow land. The point of delivery from the water district to a private banking and recharge facility is typically district owned metered turnout, with the landowner assuming all responsibility and liability for the water after the point of delivery. Because of this assumption of liability, control and protection of the water is a significant factor in the design of a recharge facility.

With these policies in place, it is desirable to develop additional underground storage for groundwater. It is also important to be able diminish water loss through evaporation, to determine where the water is going and how much storage capacity remains and, in some cases, to receive alarms when a particular aquifer is full and ground water is approaching the surface so that water may be directed to alternative water storage facilities. In addition, the incentives offered by the above-described programs typically credit the owner of the banking and recharge facility with a "banked water account credit" which is a percentage of the water banked in the facility. While the transferability and fungibility of these credits is evolving throughout the country with the development of sustainable groundwater policies, in general the credits are a valuable asset realized by owners of groundwater recharge facilities, and a method which facilitates obtaining such credits is desirable.

As opposed to surface recharge basins, some recharge facilities introduce the water into the underground reservoir by piping systems. This type of system expedites introduction of the water into the aquifer and thereby reduces evaporation losses. However, depending upon the design of the water storage facility, the underground reservoir may still require the dedication of significant areas of real property. Moreover, such systems do not, without additional control mechanisms or structure, identify the particular zones or depth into which the water is introduced. Identifying the zones or depth into the water is introduced can be a significant issue if the underground water storage facility is beneath a land surface utilized for agricultural purposes because saturation of the root-zone can be detrimental to the health of a crop.

SUMMARY OF THE INVENTION

In contrast to other known underground water storage systems and methods of utilizing the same, embodiments of the present invention deliver surface water from a remotely located surface water storage facility into an aquifer disposed below a developed parcel of land. For purposes of this disclosure, the term "remotely located surface water storage facility" includes surface reservoirs or surface containment structures maintained by third parties, such as water districts, neighboring farmers, or municipalities. Alternatively, "remotely located surface water storage facility" may be a surface containment structure located on an adjacent parcel. In all cases, the "remotely located surface water storage facility" will be located so as to not prevent or interfere with development of the land surface overlying the aquifer.

For purposes of this disclosure, the term "developed parcel of land" specifically excludes land parcels having a surface recharge basin. The term "developed parcel of land" is further defined as a parcel where the land surface is being utilized or may be utilized for agricultural, commercial, residential or other purposes where the land surface may be developed with crops, improvements such as building structures, or for other purposes, including golf courses, parks, etc.

Embodiments of the present invention utilize a piping system to deliver water from the remotely located surface water storage facility directly into the aquifer. In the case of water stored by or on behalf of a quasi-municipality, such as a water district, rights to stored water may be reclaimed, transferred, sold, etc. as groundwater recharge credits.

Embodiments of the present invention may be utilized to detect moisture and/or monitor the moisture levels in different underground zones, and actively prevent the oversaturation of upper soil layers and the root-zone of a crop by suspending water flow into the upper soil layers if water infiltration begins or if the moisture content in the crop-zone approaches an undesirable threshold. Through the use of digital control means and actuated valves, the water flow may be redirected into other groundwater recharge zones or into surface containment facilities. In addition, embodiments of the present invention may control the underground zones into which water is introduced and may maintain a record of the water volumes introduced into specific zones. Embodiments of the present invention may also, through the use of multiple moisture detectors, monitor the remaining storage capacity and provide an automated alert to the property owner, a water district, or others when the storage capacity reaches a designated level. Upon reaching the designated level, recharge water may be directed to an alternative storage facility as directed manually or automatically.

Embodiments of the present invention may further incorporate subsurface pumps which can remove water from a particular zone either for use or for redirecting to a different location in the aquifer or to a surface containment facility in the event the aquifer is at its storage limit.

The aquifer may have one or more layers, where each layer has a particular porosity for storing water and a particular permeability, which is the characteristic of the layer which allows water to flow through the interstices of the layer. The piping system has an inlet proximal to the water source for receiving a flow of the water. The piping system has an outlet proximal to one or more layers of the aquifer. A moisture detector may be disposed in the one or more layers. The moisture detector ascertains either the presence of moisture or the moisture content of a specific layer and transmits a signal to a digital processor which monitors whether moisture has been detected in the layer and, if applicable, the observed moisture content. The system may have another moisture detector set in a different layer which ascertains either the presence of moisture or the moisture content of the different layer and transmits a signal corresponding to whether moisture has been detected or the observed moisture content to the digital processor so that the digital processor may compare the observed moisture content of one layer with respect to a second layer.

For aquifers having a first porous and permeable layer overlying a second porous and permeable layer, a multi-sensor device may be utilized to ascertain the moisture contents of the first and second layers. The multi-sensor device essentially has multiple moisture sensors contained within a single housing, where the housing spans between the first and second layers.

The piping system may have an actuated control valve which controls flow of water from the surface storage facility into the aquifer. The actuated control valve may be connected to the digital processor and instructed to adjust to a variety of different positions based upon the moisture content observed in various layers of the aquifer. For aquifers which are underlying a surface crop, an actuated control valve may be instructed by a digital processor to stop flow of water into the aquifer if excessive moisture is detected adjacent to the root-zone near the soil surface. Likewise, if the land surface is developed with different improvements which may be jeopardized by a rising groundwater level, the digital processor may stop water flow into the aquifer and, if necessary, initiate draw down of the aquifer through pumping.

DETAILED DESCRIPTION OF THE INVENTION

Figure 1:
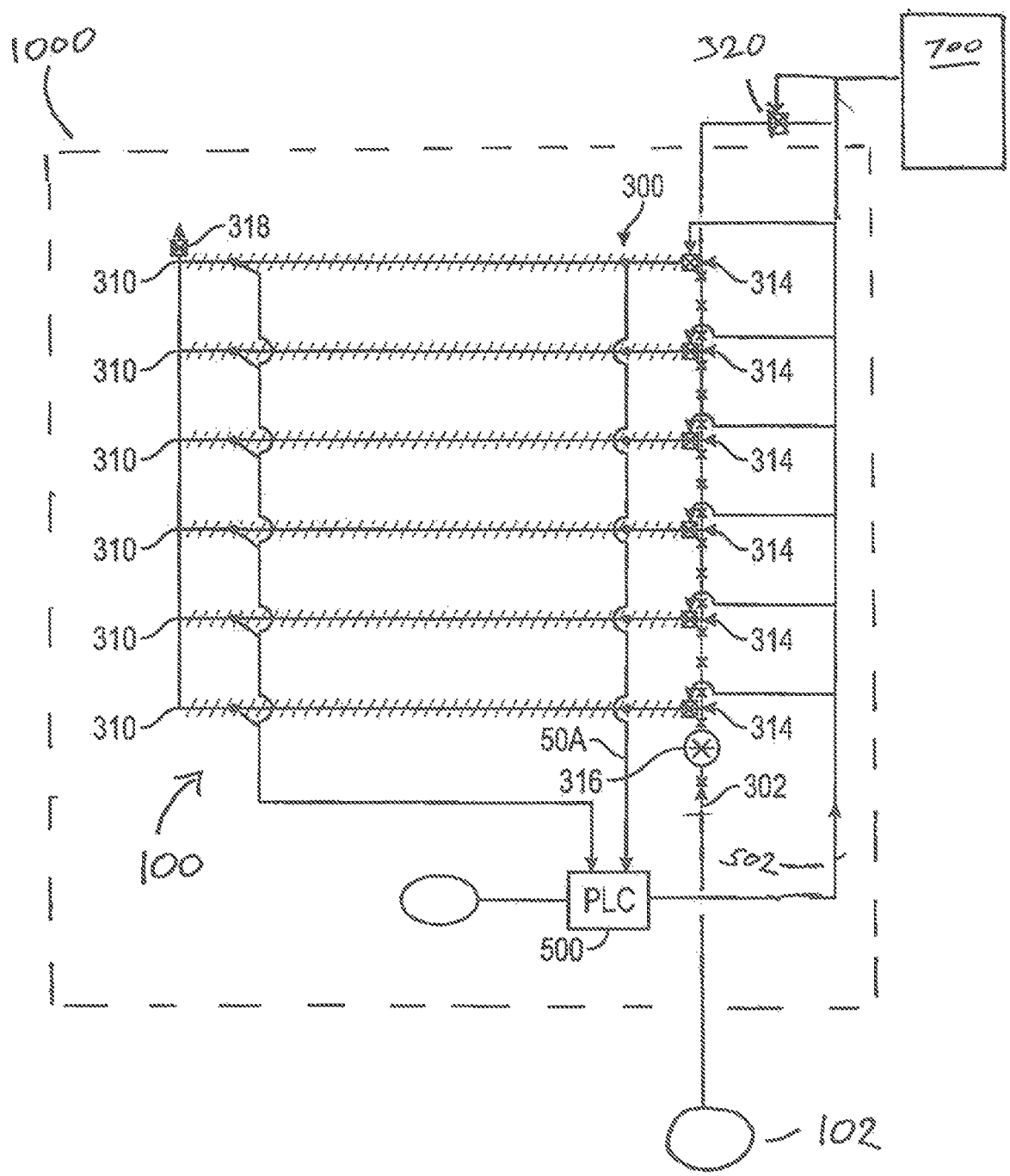
FIG. 1 schematically depicts an embodiment of the disclosed system.

Referring now to the figures, FIG. 1 schematically depicts an embodiment of a water system 100 which is located beneath a developed land parcel 1000. Developed land parcel 1000 is specifically defined herein to exclude a surface recharge basin but is otherwise defined as a parcel where the land surface is being utilized, or may be utilized for agricultural, commercial, residential, or other purposes. The developed land parcel may be utilized for growing crops or for construction of improvements such as buildings or other structures.

The water system 100 is connected to a surface water storage facility 102 which is remote from developed land parcel 1000. Surface water storage facility 102 may be either a surface containment structure, such as a tank, holding pond, catch basin, etc. Alternatively, water supply 102 may be a flowing water source including a pipe, culvert, or drain pipe operated either by the owner of the water system 100 or by a third-party such as a water district or a private landowner. It is to be appreciated that embodiments of the water system 100 may utilize a variety of different forms of water supply 102, but in each case water supply 102 is remotely located from developed land parcel 1000. These forms of remotely located surface water storage facilities may include surface reservoirs as well as structures which capture water which would otherwise be lost to sewers and storm drains. For example, the water supply 102 may capture runoff from roofs and roads through gutters and French drains.

Figure 2:
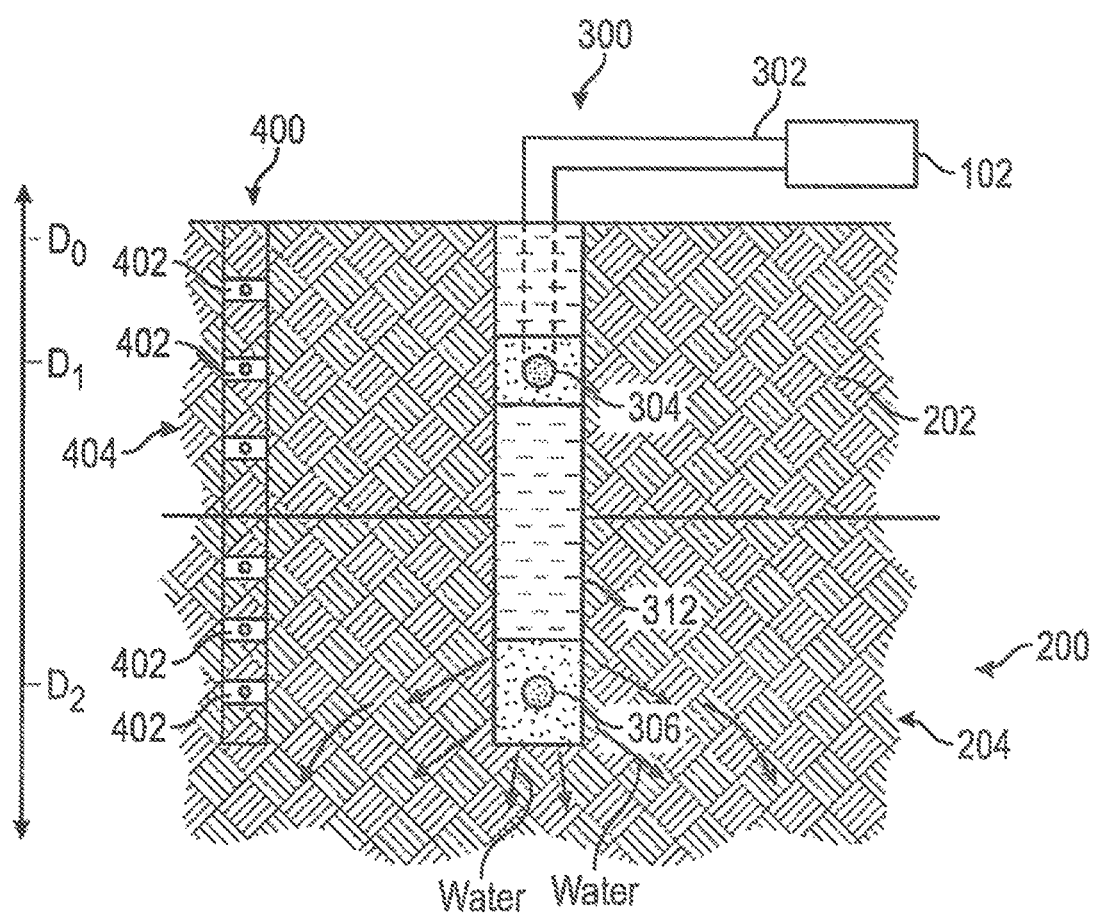
FIG. 2 is an elevational view of an outlet of a piping system for discharging water into a porous and permeable layer.
Figure 3:
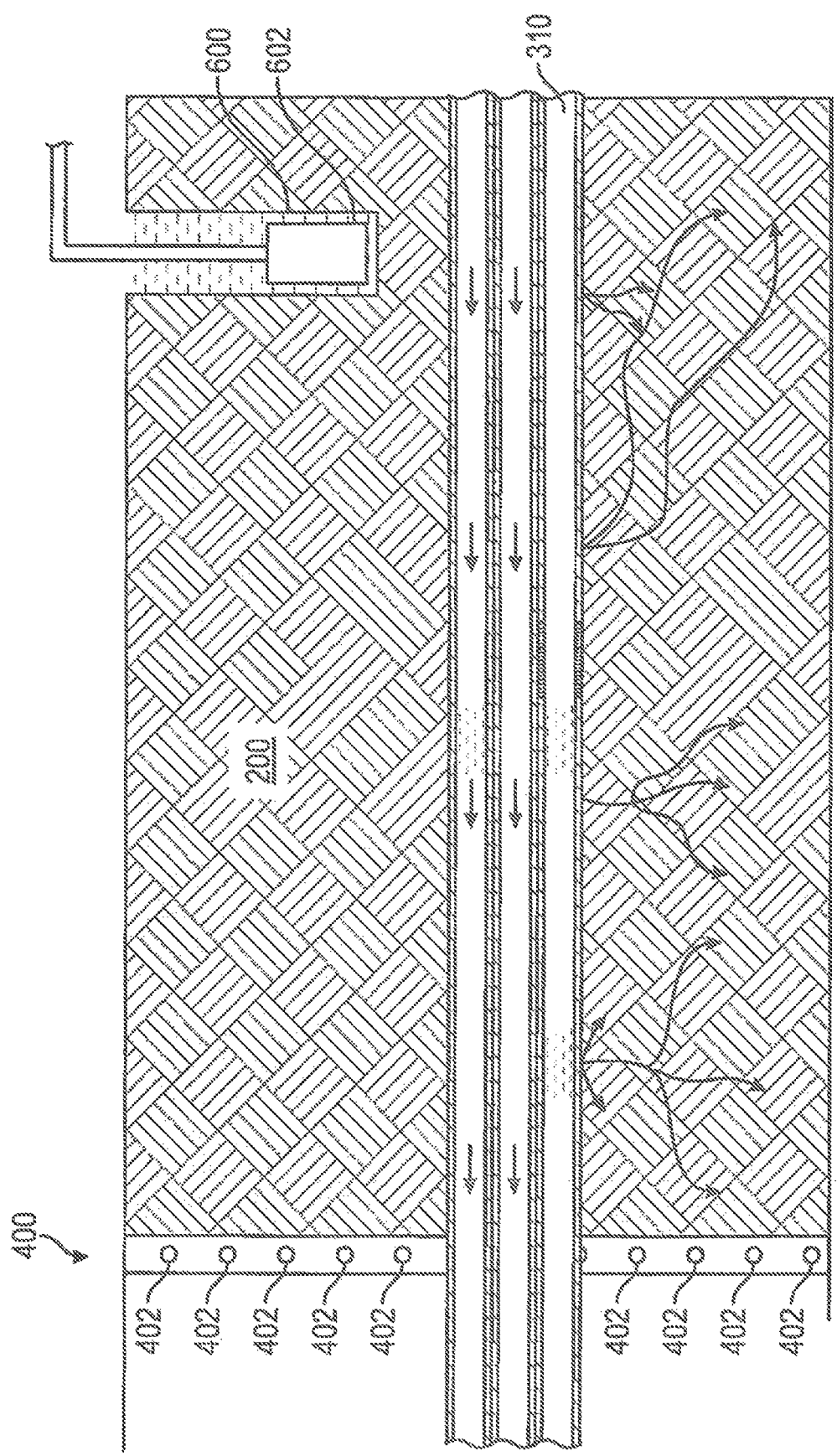
FIG. 3 is a cross-sectional view of a segment of the disclosed system.

The water system 100 comprises an aquifer 200, such as that schematically shown in FIG. 2. Aquifer 200 is disposed below developed land parcel 1000. Aquifer 200 may comprise multiple layers which may include a first porous and permeable layer 202 ("first layer") which has a general depth (or elevation) of $D_1$. First layer 202 will have generalized properties of porosity and permeability which will impact the water storage capacity of the first layer as well as the ability of water to flow through the layer vertically and laterally. Aquifer 200 may also have a second porous and permeable layer 204 ("second layer") which has a general depth of $D_2$. The second depth may be deeper than the first depth, but the first depth could be deeper, or the depths of the two layers could be approximately the same in case of laterally adjacent layers.

The generalized properties of porosity and permeability of second porous and permeable layer 204 may be approximately the same as those for first layer 202, or the generalized properties may be different, which means a difference between the water storage capacity of the of the second layer 204 and the first layer 202, and the ability of water to flow through the layers. These differences mean that the second layer 204 may have less or more capacity to store water than the first layer 202. As discussed below, these differences in water storage capacity demonstrate the desirability of separately ascertaining the moisture content of each layer.

Water system 100 includes a piping system 300 comprising an array of conduit member, where each conduit member has an outlet into the subsurface aquifer 200. Piping system 300 conveys water from the surface and distributes the water to various points within the aquifer 200, placing the water supply 102 in hydraulic communication with the aquifer 200. Piping system 300 may have an inlet 302 which is connected to the water supply 102. Inlet 302 will be set at an elevation $D_0$ which may, but not necessarily, be the approximate ground elevation. Elevation $D_0$ is typically at a higher elevation relative to the depths of the first layer 202 and second layer 204 to allow gravitational flow. Piping system 300 delivers water to an outlet 304 disposed within first layer 202. Likewise, piping system 300 may deliver water to an outlet 306 disposed within second layer 204. Although only two layers 202, 204 are shown in FIG. 2, it is to be appreciated that embodiments of the water system 100 have comprise an aquifer having many more layers and may have one or more outlets disposed within each layer.

Water system 100 further comprises a moisture detector 400. Moisture detector may have multiple sensors 402 in a single housing 404. Sensors 402 may be disposed at different depths such that moisture content for a specific layer 202, 204 or at different depths within an individual layer may be detected and monitored. Each sensor 402 within moisture detector 400 may generate an output signal associated with a moisture observed at a particular time and depth. The moisture detector 400 transmits the output signal to a digital processor 500 located at the surface.

Moisture detector 400 may be of the type which detects the presence of moisture and provides a notification of the same. Alternatively, moisture detector 400 may be of the type, such as a neutron probe device, which provides quantitative information regarding the amount of the moisture. Moisture detector 400 may be of the capacitive type which uses metallic rings as the plates of a capacitive element. The multiple sensors 402 of moisture detector are located at various depths for a specific layer and provide a profile of the soil moisture of the layer. Such moisture detectors are described, among other references, in U.S. Pat. No. 7,042,234 to Buss and U.S. Pat. No. 9,146,206 to Rhodes et al. and available through several sources including SENTEK. Embodiments of the invention may also utilize neutron probe type devices for measuring moisture, or hybrid devices which employ the technology of both capacitive and neutron probe devices.

As indicated in the figures, a section of land overlying an aquifer 200 may have a piping system 300 which provides a conduit for transmission of water from remote water supply 102 to a variety of outlets disposed within the aquifer. Piping system 300 may have a plurality of generally horizontal segments 310 which deliver water to the areal extent of the aquifer 200. Piping system 300 may also have a plurality of generally vertical segments 312 which deliver water to specific depths of the aquifer. Horizontal segments 310 and vertical segments 312 may form an intersecting matrix capable of delivering water to the lateral and depth limits of the aquifer 200.

Horizontal segments 310 and vertical segments 312 may comprise segments of perforated pipe which are set within gravel in either trenches or holes. Alternatively, the horizontal segments 310 and vertical segments 312 may have a plurality of discrete outlets for release of water at specific lateral locations and or depths within the aquifer 200.

As suggested by FIG. 1, an embodiment of the presently disclosed water system 100 may provide automated management of a water storage aquifer 200. Water from water supply 102 is provided either by pump (not shown) or by gravitation into piping system 300. Piping system 300 has one or more flow control valves 314 which are instructed by digital processor 500 to open, close, decrease flow or increase flow with the instructions provided by a control signal provided through either hard-wire connection 502 or by wireless transmission. Upon the opening of one or more control valves 314, water flows from water supply 102 into piping system 300. A water flow meter 316 may provide observed water flow rates to digital processor 500, which may have a volume totalizing algorithm which monitors total water volume delivered to aquifer 200 over a given time period. Piping system may further have a flush valve 318 to expedite draining or cleaning the piping system. Piping system 300 may be connected to overflow reservoir 700 which allows water to be directed elsewhere if desired, such as if aquifer 200 has reached capacity. Overflow reservoir 700 may either be a surface containment, a recharge basin, or a separate downhole storage reservoir.

As indicated by FIG. 1, a plurality of flow control valves 314 may be utilized to control water flow into various segments or layers of the aquifer. It is to be appreciated that while FIG. 1 appears as a plan view of a piping system, the piping segments connected to the flow control valves 314 may be horizontal segments 310 and/or vertical segments 312. The outlets 304 of a vertical segment 312 may be discrete, as opposed to a slotted pipe segment, such that separate layers of a vertical section of the aquifer 200 may be independently recharged with water. The moisture content of a specific layer may be observed with moisture detector 400 and reported back to digital processor 500 by wire connection 504 or wireless transmission. Upon receipt of this data a determination made by the digital processor whether additional water may be introduced into that specific layer or, conversely, water flow should be suspended and/or water withdrawn from that layer.

Using FIG. 2 by way of example, moisture sensors 402 may report to digital processor 500 that the lower portion of first layer 202 is full is not taking additional water and the moisture level near the surface is increasing. If the surface is used for agricultural purposes, the moisture content may be monitored near the rootzone to prevent undesirably high moisture levels near the rootzone. Upon receipt of this data, the digital processor 500 may instruct a first flow control valve 314 to stop or reduce water flow to first layer 202. The digital processor 500 may likewise instruct a second flow control valve 314 to increase water flow to second layer 204. The digital processor 500 may also start an electric submersible pump 602 set within a subsurface water well 600 to pump down the water in the aquifer 200. The digital processor 500 may further instruct control valve 320 to open to allow flow into overflow reservoir 700.

The above described system may be utilized for water storage management, where data is provided to a digital processor 500 of the storage capacity and moisture content of an aquifer 200. Upon receipt of this data, through the utilization of the piping system 300, flow control valves 314, moisture detectors 400 and other devices, the digital processor 500 may be utilized to direct the flow of water into discrete portions of the aquifer and/or to withdraw water from portions of the aquifer which have no available storage capacity. The water storage management may include the recharging of groundwater for third parties in exchange for groundwater recharge credits.

Having thus described the preferred embodiment of the invention, what is claimed as new and desired to be protected by Letters Patent includes the following:

1. A method for storing groundwater comprising the following steps:
    identifying a subsurface aquifer located beneath a developed parcel of land, the developed parcel of land having a ground surface at a base elevation, wherein the developed parcel of land has a surface use selected from the group consisting of agricultural, commercial, residential, and recreational, wherein the subsurface aquifer comprises a porous and permeable layer located at a first elevation;
    storing water in a surface water storage facility located at a first location remote from the developed parcel of land;
    conveying water through a piping system into the subsurface aquifer, wherein the piping system connects the surface water storage facility and the subsurface aquifer, the piping system comprising an array of conduit members, each conduit member having an outlet into the subsurface aquifer;
    conveying water through the piping system into the subsurface aquifer; and
    measuring the volume of water conveyed through the piping system to calculate a groundwater recharge credit from a total volume of water banked in the aquifer.

2. The method of claim 1 comprising a moisture detector disposed at an elevation between the base elevation and the first elevation.

3. The method of claim 2 wherein the moisture detector generates an output signal if moisture is detected between the base elevation and the first elevation.

4. The method of claim 3 wherein the moisture detector is able to make a quantitative determination of the moisture.

5. The method of claim 3 wherein the output signal from the moisture detector is received by a digital processing unit.

6. The method of claim 5 wherein the digital processing unit provides instructions to a first actuated valve in the piping system thereby controlling a rate of water flow into the subsurface aquifer.

7. The method of claim 6 wherein the piping system is connected to an overflow reservoir.

8. The method of claim 7 wherein the digital processing unit provides instructions to a second actuated valve in the piping system thereby controlling a flow of water into the overflow reservoir.

9. The method of claim 1 further comprising a subsurface pump extending into the subsurface aquifer.

10. The method of claim 9 wherein a digital processor provides instructions to the subsurface pump when to stop and start.

11. The method of claim 10 wherein the subsurface pump discharges into an overflow reservoir.

12. The method of claim 11 wherein a moisture detector is disposed at an elevation between the base elevation and the first elevation, wherein the moisture detector generates an output signal if moisture is detected between the base elevation and the first elevation and the output signal is received by the digital processor and the digital processor instructs the subsurface pump to start.

13. A method for obtaining a groundwater recharge credit comprising the following steps:
    accepting a volume of surface water from a third party, the third party being either a water district or a private landowner;
    transferring the volume of surface water through a piping system into a subsurface aquifer, the subsurface aquifer comprising a porous and permeable layer located at a first elevation, the subsurface aquifer located beneath a developed parcel of land, the developed parcel of land having a ground surface at a base elevation, wherein the developed parcel of land has a surface use selected from the group consisting of agricultural, commercial, residential, and recreational, the piping system comprising an array of conduit members, each conduit member having an outlet into the subsurface aquifer;
    measuring the volume of water conveyed into the subsurface aquifer to ascertain a volume of banked groundwater; and
    calculating the groundwater recharge credit from the volume of banked groundwater.

14. The method of claim 13 comprising a moisture detector disposed at an elevation between the base elevation and the first elevation.

15. The method of claim 14 wherein the moisture detector generates an output signal if moisture is detected between the base elevation and the first elevation.

16. The method of claim 15 wherein the output signal from the moisture detector is received by a digital processing unit.

17. The method of claim 15 wherein the digital processing unit provides instructions to a first actuated valve in the piping system thereby controlling a rate of water flow into the surface aquifer.

18. The method of claim 17 wherein the piping system is connected to an overflow reservoir.

19. The method of claim 18 wherein the digital processing unit provides instructions to a second actuated valve in the piping system thereby controlling a flow of water into the overflow reservoir.

20. A method for storing groundwater comprising the following steps:
    transporting a volume of water from a remote location to a developed parcel of land comprising a subsurface aquifer, wherein the developed parcel of land has a land use selected from the group consisting of agricultural, commercial, residential, and recreational, the subsurface aquifer comprising a plurality of layers;
    transferring a portion of the volume of water through a piping system into the subsurface aquifer, the piping system comprising an array of conduit members each having an outlet disposed into the subsurface aquifer;
    monitoring a moisture level within an upper layer of the plurality of layers until a presence of moisture is detected; and
    diverting any remaining water of the volume of water into an overflow reservoir.

* * * * *